(12) United States Patent
Buckley et al.

(10) Patent No.: US 12,287,053 B2
(45) Date of Patent: Apr. 29, 2025

(54) CONDUIT SUPPORT ASSEMBLY FOR HVAC AND R SYSTEM

(71) Applicant: Johnson Controls Tyco IP Holdings LLP, Milwaukee, WI (US)

(72) Inventors: Michael Lee Buckley, Abbottstown, PA (US); Xingshun Gao, York, PA (US); Jacob Conrad Ballentine, York, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/109,725

(22) Filed: Feb. 14, 2023

(65) Prior Publication Data

US 2023/0258286 A1    Aug. 17, 2023

Related U.S. Application Data (60) Provisional application No. 63/310,004, filed on Feb. 14, 2022.

(51) Int. Cl.
*F16L 3/24* (2006.01)
*F16L 3/10* (2006.01)

(52) U.S. Cl.
CPC .............. *F16L 3/24* (2013.01); *F16L 3/1033* (2013.01)

(58) Field of Classification Search
CPC . F16L 3/24; F16L 3/243; F16L 3/1033; F16L 3/1008; F16L 3/10; F16L 3/1041; F16L 3/105; F16L 3/1075; F16L 3/1083

USPC .............. 248/71, 67.5, 67.7, 73, 65
See application file for complete search history.

(56) References Cited

U.S. PATENT DOCUMENTS

| | | | | |
|---|---|---|---|---|
| 1,837,259 A | * | 12/1931 | Fitzpatrick | F16L 3/243 174/149 R |
| 3,301,514 A | * | 1/1967 | Sugaya | F16L 3/127 D8/396 |
| 3,417,951 A | * | 12/1968 | Rebentisch, Jr. | F16L 3/2431 248/62 |
| 3,531,071 A | * | 9/1970 | Kubli | F16L 3/2235 248/68.1 |
| 3,672,710 A | * | 6/1972 | Kroopp | F16B 7/0466 403/201 |
| 3,905,570 A | * | 9/1975 | Nieuwveld | F16L 3/13 24/339 |
| 4,061,299 A | * | 12/1977 | Kurosaki | F16L 3/1203 248/222.12 |
| 4,207,014 A | * | 6/1980 | Worrallo | F16B 7/0466 403/264 |
| 4,327,887 A | * | 5/1982 | Kumakura | F16L 3/1083 248/229.15 |
| 4,619,545 A | * | 10/1986 | Kuttenbaum | F16B 7/04 403/373 |

(Continued)

*Primary Examiner* — Christopher Garft
(74) *Attorney, Agent, or Firm* — Fletcher Yoder, PC (57) ABSTRACT

A conduit support assembly for a heating, ventilation, air conditioning, and/or refrigeration (HVAC&R) system includes a bracket having a base portion and a tab portion. The base portion includes a channel formed therein, the channel is configured to receive a conduit of the HVAC&R system, the tab portion is configured to be inserted through an opening in a panel of the HVAC&R system, and the base portion and the tab portion are configured to cooperatively capture the panel in an installed configuration of the conduit support assembly.

19 Claims, 8 Drawing Sheets

(56) References Cited

U.S. PATENT DOCUMENTS

| | | | | |
|---|---|---|---|---|
| 6,164,603 | A * | 12/2000 | Kawai | H02G 3/32 |
| | | | | 24/297 |
| 6,234,277 | B1 * | 5/2001 | Kaczmarek | B66B 7/06 |
| | | | | 248/62 |
| 7,179,010 | B2 * | 2/2007 | Weger | F16L 3/243 |
| | | | | 403/398 |
| 7,963,056 | B1 * | 6/2011 | Mangone, Jr. | G09F 3/205 |
| | | | | 24/459 |
| 8,785,779 | B1 * | 7/2014 | Jones | H02G 3/34 |
| | | | | 439/211 |
| 9,679,682 | B2 * | 6/2017 | Wall | H01B 17/145 |
| 2005/0163561 | A1 * | 7/2005 | Weger | F16L 3/243 |
| | | | | 403/289 |
| 2010/0207001 | A1 * | 8/2010 | Smith | F16L 55/035 |
| | | | | 248/230.4 |
| 2016/0153586 | A1 * | 6/2016 | Poikolainen | F16L 3/26 |
| | | | | 29/525 |

* cited by examiner

CONDUIT SUPPORT ASSEMBLY FOR HVAC AND R SYSTEM

CROSS REFERENCE TO RELATED APPLICATIONS

This application claims priority from and the benefit of U.S. Provisional Application Ser. No. 63/310,004, entitled "CONDUIT SUPPORT ASSEMBLY FOR HVAC&R SYSTEM", filed Feb. 14, 2022, which is hereby incorporated by reference.

BACKGROUND

This section is intended to introduce the reader to various aspects of art that may be related to various aspects of the present disclosure that are described below. This discussion is believed to be helpful in providing the reader with background information to facilitate a better understanding of the various aspects of the present disclosure. Accordingly, it should be noted that these statements are to be read in this light, and not as admissions of prior art.

Chiller systems, or vapor compression systems, utilize a working fluid (e.g., a refrigerant) that changes phases between vapor, liquid, and combinations thereof in response to exposure to different temperatures and pressures within components of the chiller system. The chiller system may place the working fluid in a heat exchange relationship with a conditioning fluid (e.g., water) and may deliver the conditioning fluid to conditioning equipment and/or a conditioned environment serviced by the chiller system. For example, the chiller system may include conduits, piping, and/or tubing configured to direct the working fluid through the chiller system, such as through a heat exchanger of the chiller system. It may be desirable to support and/or secure the conduits within the chiller system to facilitate proper operation of the chiller system.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a conduit support assembly for a heating, ventilation, air conditioning, and/or refrigeration (HVAC&R) system includes a bracket having a base portion and a tab portion. The base portion includes a channel formed therein, the channel is configured to receive a conduit of the HVAC&R system, the tab portion is configured to be inserted through an opening in a panel of the HVAC&R system, and the base portion and the tab portion are configured to cooperatively capture the panel in an installed configuration of the conduit support assembly.

In one embodiment, a conduit support system for an HVAC&R system includes a first bracket and a second bracket. A first base portion of the first bracket has a first C-shaped channel. A second base portion of the second bracket has a second C-shaped channel configured to cooperate with the first C-shaped channel to engage about a conduit in an engaged configuration of the conduit support system. A first tab portion of the first bracket and a second tab portion of the second bracket are each configured to engage with a respective opening in a support. A coupling system is configured to secure the first base portion to the second base portion in the engaged configuration of the conduit support system.

In one embodiment, a conduit support system of a HVAC&R system includes a first bracket including a first channel extending along a first base portion and a first tab portion extending from the base portion. The system also includes a second bracket including a second channel extending along a second base portion and a first tab portion extending from the base portion, wherein the first channel and the second channel face each other in an engaged configuration of the conduit support system to enclose about a conduit. The system also includes a panel with a first slot configured to receive the first tab portion and a second slot configured to receive the second tab portion to form a coupling such the first base portion and the second base portion abut a first side of the panel and the first tab and the second tab abut a second side of the panel that is opposite the first side. A coupling system is configured to secure distal ends of the first base portion and the second base portion together in the engaged configuration of the conduit support system, wherein the distal ends are distal from the coupling.

DESCRIPTION OF DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

Embodiments of the present disclosure relate to a heating, ventilation, air conditioning, and/or refrigeration (HVAC&R) system having a vapor compression system. The vapor compression system may circulate a working fluid (e.g., a refrigerant) through the HVAC&R system. For example, the vapor compression system may include a conduit system (e.g., conduits, tubing, piping) configured to direct the working fluid to different components of the HVAC&R system, such as to a compressor, a heat exchanger, and so forth. Operation of the HVAC&R system may place the working fluid in a heat exchange relationship with a conditioning fluid to enable heat transfer between the working fluid and the conditioning fluid, such as to heat and/or cool the conditioning fluid. After transferring heat with the working fluid, the conditioning fluid may be directed to a space and/or a component to condition the space and/or component. Conduit systems may include conduit for working fluid, conditioning fluid, supply air (e.g., ductwork), return air, and so forth.

It may be desirable to secure all or portions of a conduit system within the HVAC&R system to facilitate directing fluid flow, such as flow of the working fluid through the HVAC&R system. However, existing approaches may be complex and/or costly. For example, a substantial number of different coupling components (e.g., brackets, clamps, fasteners) may be utilized to couple a single conduit, pipe, or tube to another support component, such as a panel, thereby increasing a cost associated with manufacture and/or installation of the HVAC&R system. For example, costs associated with manufacture and/or installation of a conduit system having multiple conduits within the HVAC&R system can be extensive. Additionally, it may be time consuming, difficult, and/or tedious to couple each of the components to one another in order to secure the conduit within the HVAC&R system. For instance, multiple or separate assembly steps may be performed in order to secure the coupling components to one another, to the conduit, and/or to a support component. Further still, securement of the conduit within the HVAC&R system via existing approaches may be deficient. As an example, operation of the HVAC&R system may induce vibration of a conduit, and it is now recognized that the existing approaches may inadequately dampen the vibration, and/or the vibration of the conduit may mitigate or undo existing securement systems. For instance, the conduit and the support may excessively move relative to one another during operation of the HVAC&R system, and the relative movement between the conduit and the support may disengage certain coupling components, thereby inducing further relative movement between the conduit and the support.

Thus, it is now recognized that an improved system for securing the conduit within the HVAC&R system is desirable. Accordingly, embodiments of the present disclosure are directed to a conduit support assembly configured to secure a conduit to a panel. The conduit support assembly may include brackets that are configured to couple to one another and to a panel. Each bracket may include a base with a channel or recess configured to receive a conduit, and each bracket may include a tab configured to extend through the panel. Coupling the brackets to one another (e.g., by biasing the bases against one another) about the conduit, with the respective channels facing each other and facing the conduit, results in the brackets clamping onto the conduit, thereby securing the conduit within the channels. Additionally, coupling the brackets to one another may involve the bases and the tabs engaging with and capturing the panel, thereby securing the brackets and the conduit to the panel. As such, securement of the bases to one another may couple the brackets to one another, to the conduit, and to the panel, thereby facilitating installation of the conduit support assembly (e.g., using a fewer number of fasteners or other coupling components, reducing time spent to couple components to one another, reducing a cost associated with securing the conduit to the panel). Furthermore, capture of the panel via the brackets may improve securement of the bracket to the panel, such as by blocking relative movement between the brackets and the panel. Thus, the conduit support assembly may also improve securement of the conduit to the panel. It should be noted that conduit support assemblies in accordance with present embodiments may be utilized in any of various different systems, including any kind of ductwork system, conduit system, or system related to an HVAC&R system.

Figure 1:
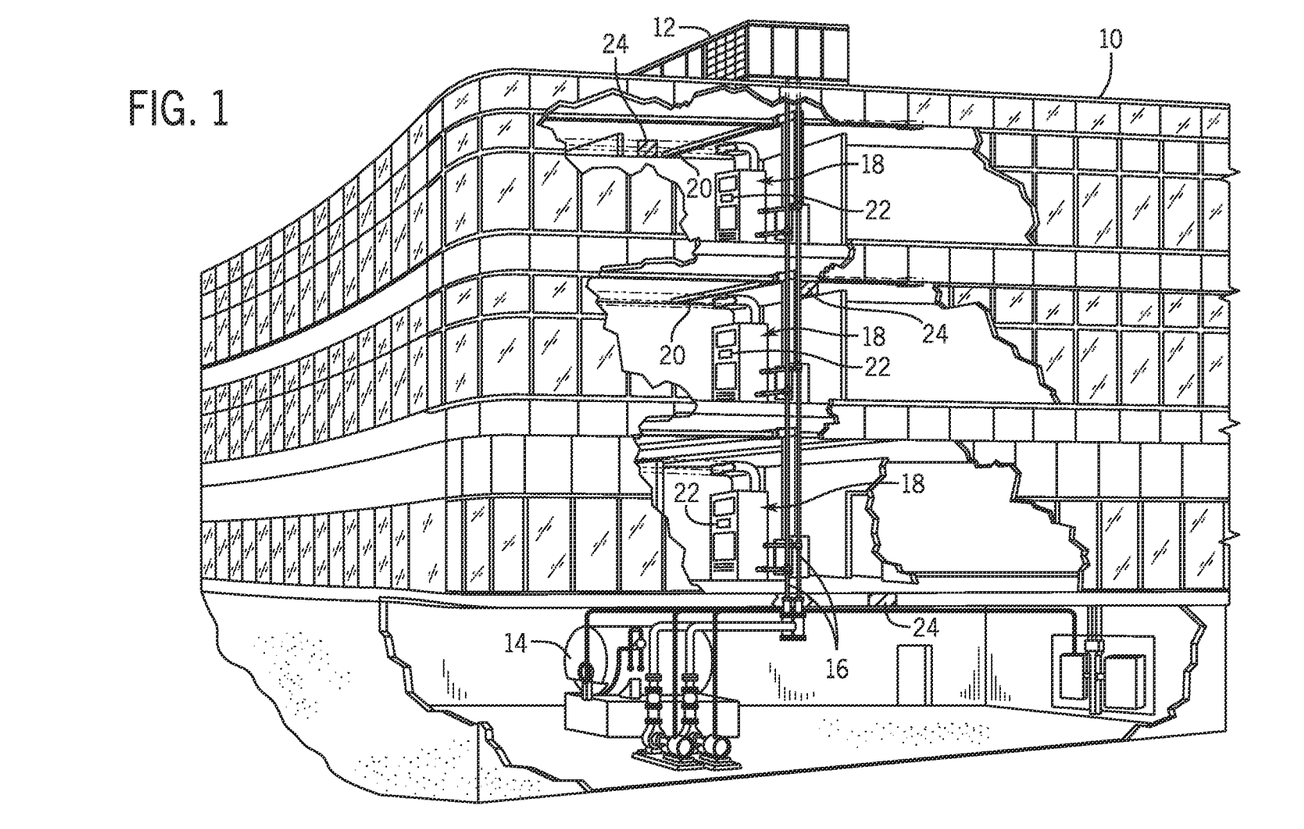
FIG. 1 is a perspective view of a building that may utilize an embodiment of an HVAC&R system in a commercial setting, in accordance with an aspect of the present disclosure.

Turning now to the drawings, FIG. 1 is a perspective view of an embodiment of an application for an HVAC&R system. Such systems, in general, may be applied in a range of settings, both within the HVAC&R field and outside of that field. The HVAC&R systems may provide cooling to data centers, electrical devices, freezers, coolers, or other environments through vapor-compression refrigeration, absorption refrigeration, or thermoelectric cooling. In presently contemplated applications, however, HVAC&R systems may be used in residential, commercial, light industrial, industrial, and in any other application for heating or cooling a volume or enclosure, such as a residence, building, structure, and so forth. Moreover, the HVAC&R systems may be used in industrial applications, where appropriate, for basic cooling and heating of various fluids.

The illustrated embodiment shows an HVAC&R system for building environmental management that may utilize heat exchangers. A building 10 is cooled by a system that includes a chiller 12 and a boiler 14. As shown, the chiller 12 is disposed on the roof of building 10, and the boiler 14 is located in the basement; however, the chiller 12 and boiler 14 may be located in other equipment rooms or areas next to the building 10. The chiller 12 may be an air cooled or water cooled device that implements a refrigeration cycle to cool water or other conditioning fluid. The chiller 12 is housed within a structure that includes a refrigeration circuit, a free cooling system, and associated equipment such as pumps, valves, and piping. For example, the chiller 12 may be single package rooftop unit that incorporates a free cooling system. The boiler 14 is a closed vessel in which water is heated. The water from the chiller 12 and the boiler 14 is circulated through the building 10 by water conduits 16. The water conduits 16 are routed to air handlers 18 located on individual floors and within sections of the building 10.

The air handlers 18 are coupled to ductwork 20 that is adapted to distribute air between the air handlers 18 and may receive air from an outside intake (not shown). The air handlers 18 include heat exchangers that circulate cold water from the chiller 12 and hot water from the boiler 14 to facilitate provision of heated or cooled air to conditioned spaces within the building 10. Fans within the air handlers 18 draw air through the heat exchangers and direct (e.g., via the ducts 20) the conditioned air to environments within building 10, such as rooms, apartments, or offices, to maintain the environments at a designated temperature. A control device, shown here as including a thermostat 22, may be used to designate the temperature of the conditioned air. The control device 22 also may be used to control the flow of air through and from the air handlers 18. Other devices may be included in the system, such as control valves that regulate the flow of water and pressure and/or temperature transducers or switches that sense the temperatures and pressures of the water, the air, and so forth. Moreover, control devices may include computer systems that are integrated with or separate from other building control or monitoring systems, and even systems that are remote from the building 10.

Conduit support assemblies 24 may support any of the various types of conduit utilized in the HVAC&R system of FIG. 1. For example, conduit support assemblies 24 are illustrated as securing the water conduits 16 and the ductwork 20 to support structures within or integrated with the building 10. Specifically, as will be discussed further below, the conduit support assemblies 24 utilize bases operable to couple together about conduit and operable to couple with a panel via tabs extending from each base. The panels may be integral with or coupled to other support structures (e.g., walls or other structural features of or within the building 10).

Figure 2:
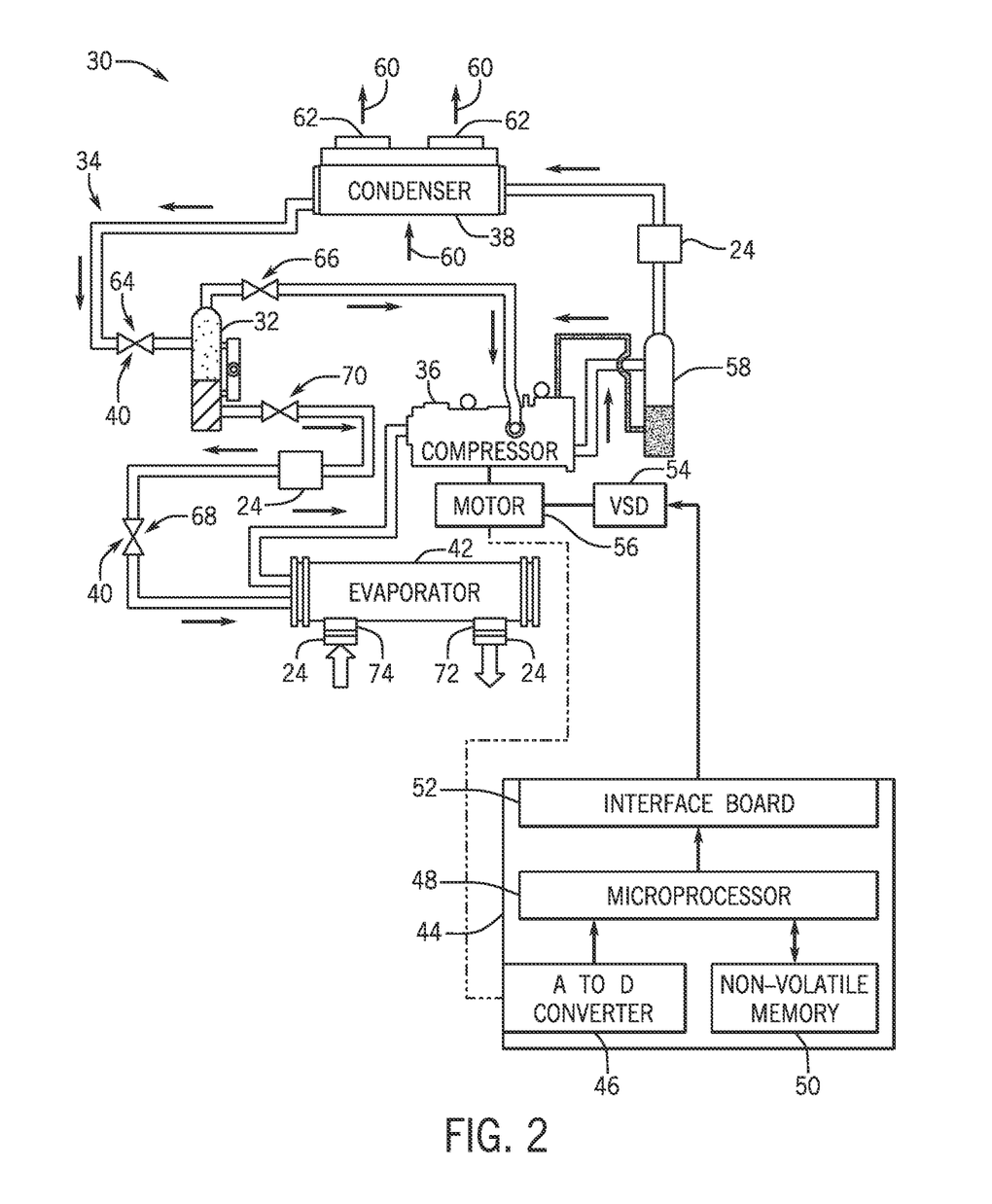
FIG. 2 is a schematic of an embodiment of a vapor compression system, in accordance with an aspect of the present disclosure.

FIG. 2 is a schematic of an embodiment of a vapor compression system 30. For example, the vapor compression system 30 may be a part of an air-cooled chiller. However, it should be appreciated that the disclosed techniques may be incorporated with a variety of other types of chillers. The vapor compression system 30 includes a refrigerant circuit 34 configured to circulate a working fluid, such as refrigerant, therethrough with a compressor 36 (e.g., a screw compressor) disposed along the refrigerant circuit 34. The refrigerant circuit 34 also includes a flash tank 32, a condenser 38, expansion valves or devices 40, and a liquid chiller or an evaporator 42. The components of the refrigerant circuit 34 enable heat transfer between the working fluid and other fluids (e.g., a conditioning fluid, air, water) in order to provide cooling to an environment, such as an interior of the building 10.

Some examples of working fluids that may be used as refrigerants in the vapor compression system 30 are hydrofluorocarbon (HFC) based refrigerants, for example, R-410A, R-407, R-134a, hydrofluoro-olefin (HFO), "natural" refrigerants like ammonia (NH3), R-717, carbon dioxide (CO2), R-744, or hydrocarbon based refrigerants, water vapor, refrigerants with low global warming potential (GWP), or any other suitable refrigerant. In some embodiments, the vapor compression system 30 may be configured to efficiently utilize refrigerants having a normal boiling point of about 19 degrees Celsius (66 degrees Fahrenheit or less) at one atmosphere of pressure, also referred to as low pressure refrigerants, versus a medium pressure refrigerant, such as R-134a. As used herein, "normal boiling point" may refer to a boiling point temperature measured at one atmosphere of pressure.

The vapor compression system 30 may further include a control panel 44 (e.g., controller) that has an analog to digital (A/D) converter 46, a microprocessor 48, a non-volatile memory 50, and/or an interface board 52. In some embodiments, the vapor compression system 30 may use one or more of a variable speed drive (VSDs) 54 and a motor 56. The motor 56 may drive the compressor 36 and may be powered by the VSD 54. The VSD 54 receives alternating current (AC) power having a particular fixed line voltage and fixed line frequency from an AC power source, and provides power having a variable voltage and frequency to the motor 56. In other embodiments, the motor 56 may be powered directly from an AC or direct current (DC) power source. The motor 56 may include any type of electric motor that can be powered by the VSD 54 or directly from an AC or DC power source, such as a switched reluctance motor, an induction motor, an electronically commutated permanent magnet motor, or another suitable motor.

The compressor 36 compresses a refrigerant vapor and may deliver the vapor to an oil separator 58 that separates oil from the refrigerant vapor. The refrigerant vapor is then directed from the oil separator 58 toward the condenser 38, and the oil accumulated in the oil separator 58 is returned to the compressor 36. The refrigerant vapor delivered to the condenser 38 may transfer heat to a cooling fluid at the condenser 38. For example, the cooling fluid may be ambient air 60 forced across heat exchanger coils of the condenser 38 by condenser fans 62. The refrigerant vapor may condense to a refrigerant liquid in the condenser 38 as a result of thermal heat transfer with the cooling fluid (e.g., the ambient air 60).

The liquid refrigerant exits the condenser 38 and then flows through a first expansion device 64 (e.g., expansion device 40, electronic expansion valve). The first expansion device 64 may be a flash tank feed valve configured to control flow of the liquid refrigerant to the flash tank 32. The first expansion device 64 is also configured to lower the pressure of (e.g., expand) the liquid refrigerant received from the condenser 38. During the expansion process, a portion of the liquid may vaporize, and thus, the flash tank 32 may be used to separate the vapor from the liquid received from the first expansion device 64. Additionally, the flash tank 32 may provide for further expansion of the liquid refrigerant because of a pressure drop experienced by the liquid refrigerant when entering the flash tank 32 (e.g., due to a rapid increase in volume experienced when entering the flash tank 32).

The vapor in the flash tank 32 may exit and flow to the compressor 36. For example, the vapor may be drawn to an intermediate stage or discharge stage of the compressor 36 (e.g., not the suction stage). A valve 66 (e.g., economizer valve, solenoid valve) may be included in the refrigerant circuit 34 to control flow of the vapor refrigerant from the flash tank 32 to the compressor 36. In some embodiments, when the valve 66 is open (e.g., fully open), additional liquid refrigerant within the flash tank 32 may vaporize and provide additional subcooling of the liquid refrigerant within the flash tank 32. The liquid refrigerant that collects in the flash tank 32 may be at a lower enthalpy than the liquid refrigerant exiting the condenser 38 because of the expansion in the first expansion device 64 and/or the flash tank 32. The liquid refrigerant may flow from the flash tank 32, through a second expansion device 68 (e.g., expansion device 40, an orifice), and to the evaporator 42. In some embodiments, the refrigerant circuit 34 may also include a valve 70 (e.g., drain valve) configured to regulate flow of liquid refrigerant from the flash tank 32 to the evaporator 42. For example, the valve 70 may be controlled (e.g., via the control panel 44) based on an amount of suction superheat of the refrigerant.

The liquid refrigerant delivered to the evaporator 42 may absorb heat from a conditioning fluid, which may or may not be the same cooling fluid used in the condenser 38. The liquid refrigerant in the evaporator 42 may undergo a phase change to become vapor refrigerant. For example, the evaporator 42 may include a tube bundle fluidly coupled to a supply line 72 and a return line 74 that are connected to a cooling load. The conditioning fluid of the evaporator 42 (e.g., water, oil, calcium chloride brine, sodium chloride brine, or any other suitable fluid) enters the evaporator 42 via the return line 74 and exits the evaporator 42 the via supply line 72. The evaporator 42 may reduce the temperature of the conditioning fluid in the tube bundle via thermal heat transfer with the refrigerant so that the conditioning fluid may be utilized to provide cooling for a conditioned environment. The tube bundle in the evaporator 42 can include a plurality of tubes and/or a plurality of tube bundles. In any case, the refrigerant vapor exits the evaporator 42 and returns to the compressor 36 by a suction line to complete the refrigerant cycle.

It should be appreciated that any of the features described herein may be incorporated with the vapor compression system 30 or any other suitable HVAC&R systems. For example, the present techniques may be incorporated with any HVAC&R system having conduits, piping, or tubing configured to circulate fluid therethrough. While the discussion below describes the present techniques implemented with an air-cooled chiller, it should be appreciated that the disclosed techniques may be utilized with other HVAC&R systems having conduits.

Vibrations associated with operation of the vapor compression system 30 along with other factors (e.g., shifting of associated structures) create a need for support of system conduits. Accordingly, one or more of the conduit support assemblies 24 may be utilized through the vapor compression system 30, which is an example of an HVAC&R system, to secure one or more conduits. For example, a conduit support assembly 24 may secure conduit of the refrigeration circuit 34, conduit of the supply line 72, conduit of the return line 74, conduit associated with guiding the ambient air 60, or the like to a panel, sheet, plate, or other structural support or surface (e.g., of a housing of the HVAC&R system).

A conduit support assembly 24 may include brackets (e.g., clamping portions) that each include a base portion and a tab portion. The tab portion may be inserted through an opening of a panel or other structural member of the HVAC&R system, such that the tab portion is positioned on a first side of the panel and the base portion is positioned on a second side, opposite the first side, of the panel. Each base portion may include a channel or recess configured to at least partially receive a conduit. A pair of brackets may be positioned such that the respective channels cooperatively form a space in which the conduit may be positioned, and the base portions of the brackets may be secured to one another (e.g., via a fastener, latch, friction fit mating features) to secure the brackets to the conduit. Biasing the base portions against one another may also cause the base portions to engage with the first side of the panel and to cause the tab portions to engage with the second side of the panel. Thus, the brackets may also capture the panel to secure the brackets and therefore the conduit to the panel. Although the present disclosure primarily discusses securement of a conduit to a panel with the conduit support assembly, the techniques described herein may be utilized to secure a conduit to any other suitable component or support of the HVAC&R system.

Figure 3:
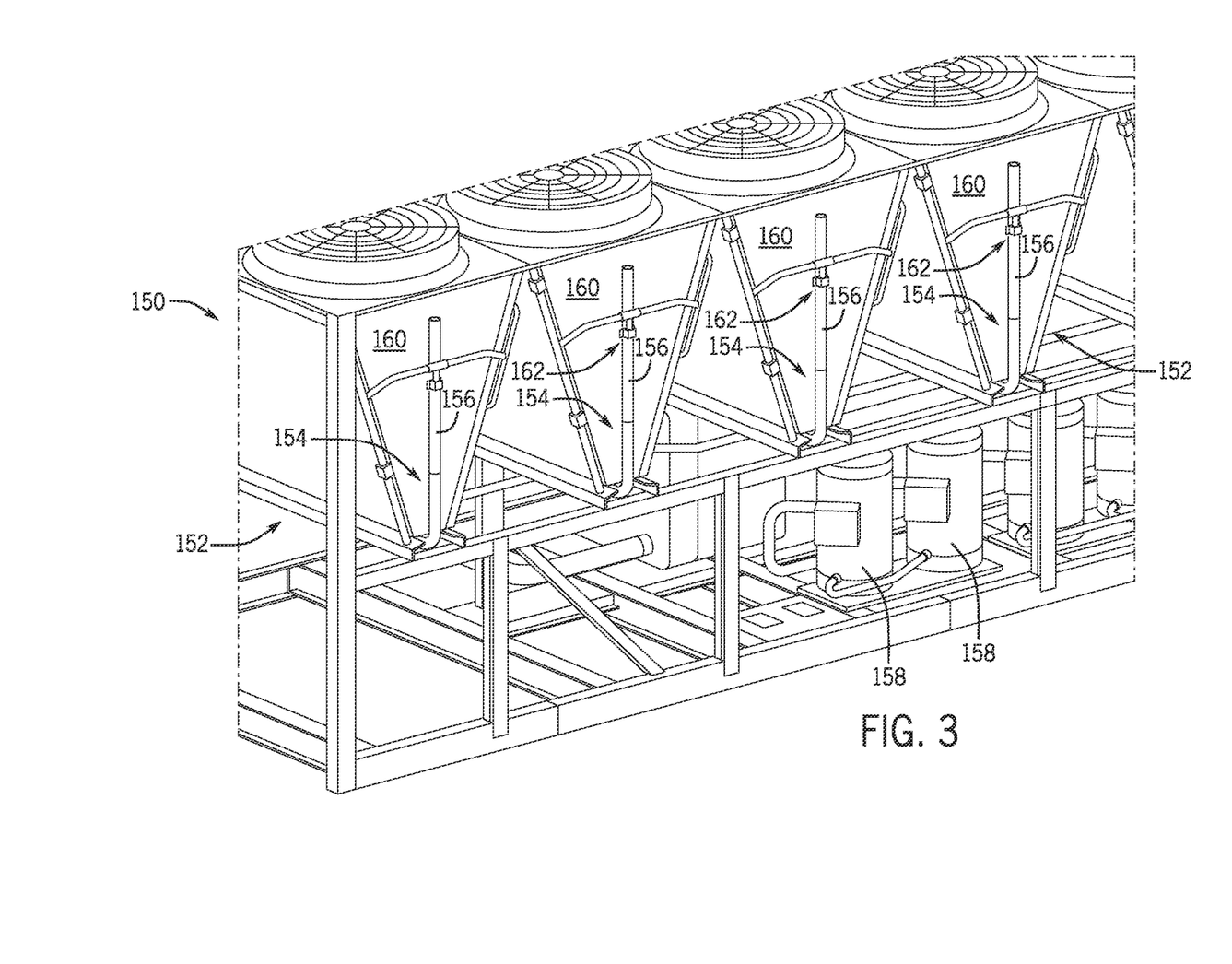
FIG. 3 is a perspective view of an embodiment of an HVAC&R system, in accordance with an aspect of the present disclosure.

With this in mind, FIG. 3 is a perspective view of an HVAC&R system 150, such as a portion of the HVAC&R system 10. For example, the HVAC&R system 150 may include multiple heat exchanger coils 152, such as condenser coils (e.g., the condenser 34). The HVAC&R system 150 may include a conduit system 154 configured to circulate a working fluid (e.g., a refrigerant) through various components of the HVAC&R system 150. For example, the conduit system 154 may include a conduit 156 (e.g., a pipe, a tube, a discharge header) configured to direct the working fluid into the heat exchanger coils 152 (e.g., from one or more compressors 158, such as the compressor 32), out of the heat exchanger coils 152 (e.g., to another heat exchanger, such as the evaporator 38), and/or through other portions or components of the HVAC&R system 150. Indeed, as shown in the illustrated embodiment, the HVAC&R system 150 may include multiple conduits 156 configured to direct the working fluid through the conduit system 154.

The conduit 156 may be secured in a desired location or position within the HVAC&R system 150. For example, panels 160 may be coupled to the heat exchanger coils 152 to occlude spaces formed between the heat exchanger coils 152 to enable and/or direct a flow of air across the heat exchanger coils 152. As shown in the illustrate embodiment, each conduit 156 may be secured to one of the panels 160 via a respective conduit support assembly 162, which may be a version of the conduit support assembly 24. The conduit support assembly 162 may block relative movement between the conduit 156 and the panel 160. In particular, the conduit support assembly 162 may capture the conduit 156, as well as the panel 160, to enable securement therebetween. Additionally, the conduit support assembly 162 may be readily incorporated within the HVAC&R system 150. For instance, as further described herein, the conduit support assembly 162 may have a limited number of components or parts that may be quickly and conveniently assembled to one another and to the panel 160. In this way, the conduit support assembly 162 disclosed herein enables a reduction in complexity, assembly time, and/or cost associated with manufacture and/or installation of the conduit support assembly 162.

Figure 4:
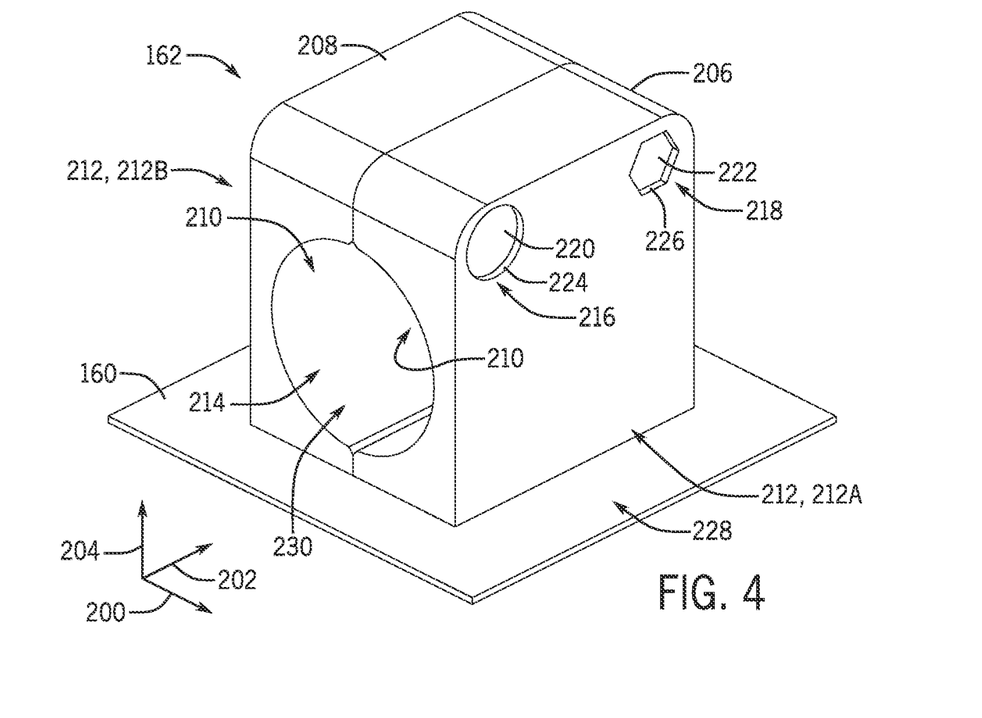
FIG. 4 is a perspective view of an embodiment of a conduit support assembly of an HVAC&R system, in accordance with an aspect of the present disclosure.

FIG. 4 is a perspective view of an embodiment of the conduit support assembly 162 coupled to the panel 160. The conduit support assembly 162 may be described with respect to a first axis 200 (e.g., a lateral axis), a second axis 202 (e.g., a longitudinal axis), and a third axis 204 (e.g., a vertical axis). The conduit support assembly 162 may include a first bracket 206 (e.g., a first clamp, a first support) and a second bracket 208 (e.g., a second clamp, a second support) configured to couple to one another in an installed configuration of the conduit support assembly 162. Each of the first bracket 206 and the second bracket 208 includes a base portion 212 (e.g., a main body portion) with a channel 210 (e.g., a recess) formed therein. Thus, the base portion 212 of each bracket 206, 208 may have a C-shaped profile or geometry because the channel 210 has a C-shape. In the installed configuration, the channels 210 may cooperatively form an opening or receptacle 214 of the conduit support assembly 162 through which the conduit 156 may extend and in which the conduit 156 may be secured. The brackets 206, 208 may be biased against one another and secured to each other to capture the conduit 156 within the opening 214 (e.g., the channels 210), thereby securing the brackets 206, 208 to the conduit 156.

Moreover, each bracket 206, 208 may be configured to couple to the panel 160. By way of example, as further discussed herein, the panel 160 may include openings or slots, and each bracket 206, 208 may include a tab portion extending from the base portion 212 and designed to extend through the openings or slots. The tab portion may be configured to extend into one of the openings of the panel 160 and engage with the panel 160 to couple the bracket 206, 208 to the panel 160. For example, the base portion 212 and the tab portion may cooperatively capture the panel 160 therebetween to secure the bracket 206, 208 to the panel 160 and restrict relative movement between the panel 160 and the bracket 206, 208 in the installed configuration of the conduit support assembly 162.

As mentioned above, the brackets 206, 208 are also configured to couple to one another in the installed configuration of the conduit support assembly 162. For example, a first opening 216 and a second opening 218 may be formed through the base portion 212A of the first bracket 206 (e.g., along the first axis 200). The first opening 216 and the second opening 218 may be configured to align with (e.g., concentrically align with) corresponding openings formed through the base portion 212B of the second bracket 208. Respective fasteners may be inserted through the openings 216, 218 and engaged to bias the brackets 206, 208 to one another. As an example, a fastener 220 (e.g., a bolt, a screw) may be inserted through the first opening 216 of the first bracket 206 and a corresponding opening of the second bracket 208 aligned with the first opening 216, and the fastener 220 may be tightened to bias the brackets 206, 208 against one another. For instance, the fastener 220 may engage with (e.g., thread into) a nut disposed in the corresponding opening of the second bracket 208 to bias the base portions 212 of the brackets 206, 208 against one another. Further, an additional fastener may be inserted through an additional opening of the second bracket 208 and through the second opening 218 of the first bracket 206 that is aligned with the additional opening of the second bracket 208. The additional fastener may also be tightened to bias the brackets 206, 208 against one another. By way of example, a nut 222 (e.g., a threaded nut) may be disposed within the second opening 218 of the first bracket 206, and the nut 222 may be configured to receive the additional fastener extending through the additional opening of the second bracket 208 and the second opening 218 to enable the additional fastener to bias the base portions 212 of the brackets 206, 208 against one another.

In the illustrated embodiment, a first recess 224 and a second recess 226 may be formed in a first side 228 of the base portion 212A of the first bracket 206. The first recess 224 may be configured to receive the fastener 220 to enable the fastener 220 to extend into the first opening 216 of the first bracket 206 on the first side 228. For example, the first recess 224 (e.g., a countersink or a counterbore) may be shaped to capture a head of the fastener 220 inserted through the first opening 216. Additionally, the second recess 226 may be configured to receive the nut 222 within the second opening 218 to enable engagement between the nut 222 and the additional fastener inserted through the additional opening of second bracket 208 and into the second opening 218. The second recess 226 may have a shape, profile, or geometry that captures (e.g., corresponds to) a profile of the nut 222. For instance, the second recess 226 may retain the nut 222 and block rotation of the nut 222 within the second recess 226 to facilitate coupling of the nut 222 to the additional fastener inserted through the second bracket 208 and into the first bracket 206. That is, the second recess 226 may block rotation of the nut 222 while the additional fastener is rotated (e.g., on an outer side of the second bracket 208 opposite the first bracket 206) relative to the nut 222 to thread the additional fastener into the nut 220 to facilitate coupling between the additional fastener and the nut 222.

Figure 5:
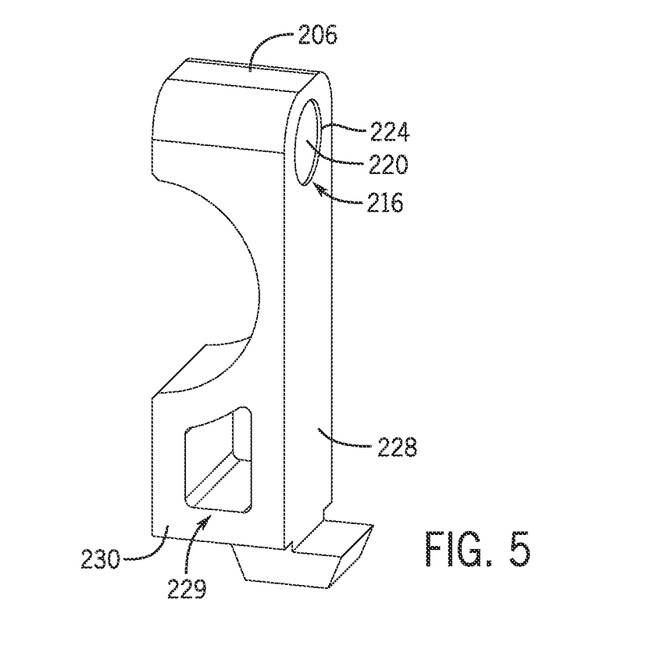
FIG. 5 is a perspective view of an embodiment of a bracket of a conduit support assembly of an HVAC&R system, in accordance with an aspect of the present disclosure.

While the illustrated embodiment includes two openings (i.e., the first opening 216 and the second opening 218), embodiments in accordance with the present disclosure may include additional openings or no openings. For example, other fasteners may be employed to secure the brackets 206, 208 together, including snap fit connectors, hinged clamping components, friction fit connectors, and the like. Further, while the illustrated openings 216, 218 respectively have a circular and hexagonal shape, different shapes (e.g., square, octagonal) may be employed in other embodiments. For example, FIG. 5 illustrates an embodiment of the first bracket 206 including only one opening 216 (e.g., circular opening), which may allow for accessing a fastener or nut 220 via a tool, such as a ratchet. Additionally, as illustrated in FIG. 5, the brackets 206 may include an opening 229 through the sides (e.g., the second side 230), which may conserve material used to form the bracket 206. The opening 229 may be a recess or a passage extending completely through a side of the respective bracket 206. The nature (e.g., size, shape, location) of the opening 229 may depend on structural requirements for the bracket 206. For example, limited material may be needed to provide the desired level of support via the bracket 206. Thus, material can be conserved without impacting strength and operability of the bracket 206. The bracket 206 (and other components) may be formed from materials used with injection molding, additive formation (e.g., 3D printing), or the like. Thus, by defining the opening 229 the bracket 206 and the process for making, shipping, and working with the bracket 206 may be reduced. Indeed, material used to form the bracket 206 may be conserved, weight of the bracket 206 may be relatively reduced, which may reduce shipping costs and increase ease of installation. Although not shown in FIG. 5, it should be understood that the bracket 208 of FIG. 4 may include, in certain embodiments, the same or similar features as the bracket 206 of FIG. 5.

The channel 210 of the first bracket 206 may be formed in a second side 230 (e.g., an internal side) of the base portion 212A, opposite the first side 228. For example, the first side 228 of the base portion 212A may be an exterior side (e.g., an exterior facing side) of the first bracket 206, and the second side 230 of the base portion 212A may be an interior side (e.g., an interior facing side) of the first bracket 206. The second bracket 208 may have similar features in a similar arrangement as the first bracket 206. Thus, the conduit 156 may be positioned within the opening 214 and within an interior of the conduit support assembly 162.

In some embodiments, the second bracket 208 may have a similar or substantially the same profile (e.g., a geometry, a configuration) as that of the first bracket 206. For example, the second bracket 208 may be of the same embodiment as the first bracket 206. Indeed, in some embodiments, the first bracket 206 and the second bracket 208 may be substantially identically to one another. Thus, two articles of a single bracket embodiment may be manufactured and utilized as the first bracket 206 and the second bracket 208. In an installed configuration, the first bracket 206 and the second bracket 208 may face one another in opposite orientations about the third axis 204 (e.g., the first bracket 206 and the second bracket 208 may be flipped in orientation about a plane formed via the second axis 202 and the third axis 204).

In such embodiments, the first opening 216 of the first bracket 206 may align with the second opening 218 of the second bracket 208 in the installed configuration. As similarly described above with reference to the first bracket 206, the second opening 218 of the second bracket 208 may include the recess 226 formed therein, and another nut 222 may be disposed in the recess 226 of the second bracket 208. Thus, the fastener 220 inserted through the first opening 216 of the first bracket 206 and the second opening 222 of the second bracket 208 may engage with the additional nut 222 to enable securement of the first bracket 206 and the second bracket 208 to one another. Furthermore, the second bracket 208 may also include the first opening 216, which may align with the second opening 218 of the first bracket 206 in the installed configuration. Similarly, the second bracket 208 may include the recess 224 formed in the first opening 216, and a fastener (e.g., another fastener 220) may extend through the first opening 216 of the second bracket 208 and the second opening 218 of the first bracket 206 to engage with the nut 222 disposed in the second recess 226 of the first bracket 206. In this manner, multiple brackets of the same embodiment may be manufactured and utilized as the first bracket 206 and the second bracket 208 to form the conduit support assembly 162. Indeed, numerous articles of the same bracket embodiment may be manufactured and utilized to form multiple conduit support assemblies 162, thereby reducing a cost, time, and/or complexity associated with manufacture and/or installation of multiple conduit support assemblies 162.

In some embodiments, the brackets 206, 208 may be formed from a material, such as a plastic and/or a rubber, having damping characteristics that block, mitigate, and/or reduce relative movement between the conduit 156 and the panel 160. As will be appreciated, operation of the HVAC&R system 150 may induce vibrations in the conduit 156, the panel 160, and/or other components that may otherwise be propagated throughout the HVAC&R system 150. Thus, the material of the brackets 206, 208 may be selected to reduce transmission of such vibrations. The material of the brackets 206, 208 may additionally and/or alternatively have insulative properties to block heat transfer between the conduit 156 and the brackets 206, 208 and/or between the panel 160 and the brackets 206, 208. In this way, the brackets 206, 208 may enable an increase in heat transfer efficiency of working fluid directed through the conduit 156 and/or through the heat exchanger 152. In some embodiments, the material of the brackets 206, 208 may further include one or more surface treatments or properties, such as an ultraviolet stabilized material, to increase a useful life of the brackets 206, 208. For example, a material of the brackets 206, 208 may be selected based on an application or installed environment of the brackets 206, 208 and/or a location of the conduit support assembly 162 (e.g., within an ambient environment). In some embodiments, the brackets 206, 208 may be manufactured via a molding or other suitable forming process.

Although the illustrated first bracket 206 includes two openings 216, 218, the first bracket 206 and/or the second bracket 208 may include any suitable number of openings that enable securement of the brackets 206, 208 to one another, such as one opening, three openings, or more than three openings. Additionally or alternatively, the brackets 206, 208 may be configured to couple to one another using a different feature or technique, such as a weld, an adhesive, another type of fastener (e.g., a rivet), a punch, and the like.

Figure 6:
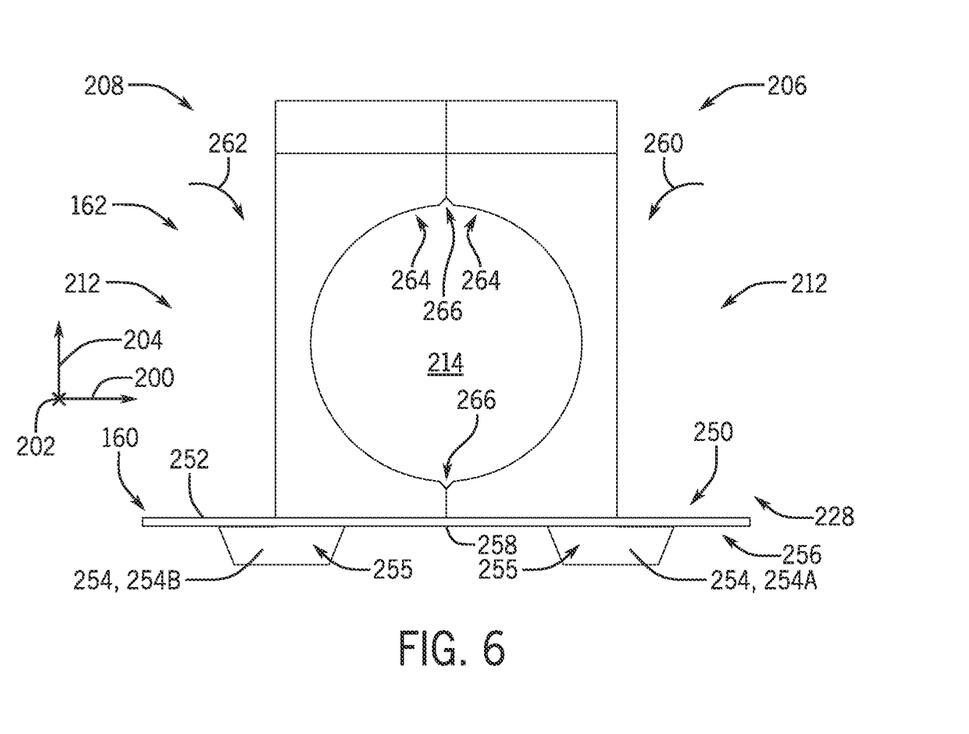
FIG. 6 is a front view of an embodiment of a conduit support assembly of an HVAC&R system, in accordance with an aspect of the present disclosure.

FIG. 6 is a front view of an embodiment of the conduit support assembly 162 in the installed configuration with the panel 160. The base portion 212 of each bracket 206, 208 may be disposed on a first side 250 of the panel 160 and may be engaged with (e.g., abutting) a first surface 252 of the panel 160, in the installed configuration. Additionally, each bracket 206, 208 may include a tab portion 254 that may extend from a respective third side 255 of each bracket 206, 208 that extends crosswise to the first side 228 and the second side 230 of the base portion 212. For example, as shown in FIG. 6, the tab portion 254 may extend along the first axis 200 beyond an edge or boundary of the first side 228 of the base portion 212. In the illustrated configuration, the tab portion 254 is largely disposed on a second side 256, opposite the first side 250, of the panel 160. The tab portion 254 also engages with a second surface 258 of the panel 160 in the installed configuration. Each bracket 206, 208 may capture the panel 160 via engagement between the respective base portion 212 and the first surface 252 and via engagement between the respective tab portion 254 and the second surface 258. In other words, the base portion 212 and the tab portion 254 of each bracket 206, 208 captures the panel 160 therebetween.

As mentioned above, the panel 160 may include openings or slots formed therein and through which the brackets 206, 208 may extend to couple the conduit support assembly 162 to the panel 160. By way of example, in order to couple each bracket 206, 208 to the panel 160, each bracket 206, 208 may be oriented (e.g., angled) with respect to the panel 160 to enable insertion of the respective tab 254 through one of the openings of the panel 160 until the base portion 212 abuts against the first surface 252. After the tab portion 254 is inserted through the corresponding opening of the panel 160, the bracket 206, 208 may be rotated (e.g., the first bracket 206 may be rotated in a first rotational direction 260 about the second axis 202, and the second bracket 208 may be rotated in a second rotational direction 262, opposite the first rotational direction 260, about the second axis 202) until the base portion 212 abuts against the first surface 252 of the panel 160 and/or the tab portion 254 abuts against the second surface 258 of the panel 160. With each of the brackets 206, 208 coupled to the panel 160 in this manner, the base portions 212 of the brackets 206, 208 may engage with one another. For example, respective distal portions 264 (e.g., peripheral portions, end portions, outer portions, portions opposite the tab portions) of the brackets 206, 208 may abut one another. In this configuration, the openings 216, 218 of the brackets 206, 208 may be in alignment with one another to enable insertion of fasteners 220 through the respective distal portions 264 of the base portions 212. The fasteners 220, or any other suitable coupling technique or feature, may be actuated to bias the distal portions 264 of the brackets 206, 208 against one another to cause further rotation of the brackets 206, 208 in the rotational directions 260, 262, respectively. In this way, increased engagement between the base portions 212, between the first surface 252 and the base portions 212, and/or between the tabs 254 and the second surface 258 is enabled. In other words, biasing and securing the distal portions 264 against one another may secure the brackets 206, 208 to one another, to the panel 160, and to the conduit 156 disposed within the opening 214. In the manner described above, the brackets 206, 208 may be secured to the panel 160 without use of separate fasteners extending through the brackets 206, 208 and the panel 160. Therefore, a limited or reduced number of components may be used to assemble and/or install the conduit support assembly 162 and secure the conduit 156 in place relative to the panel 160.

In the installed configuration, surfaces (e.g., internal surfaces) on the second sides 230 of the base portions 212 of the brackets 206, 208 may cooperatively form notches 266 in the conduit support assembly 162 within the opening 214. The notches 266 may facilitate positioning of the conduit 156 within the opening 214 during installation of the conduit support assembly 162 with the panel 160. For example, the notches 266 may provide a threshold amount of tolerance to accommodate a dimension of the conduit 156, thereby improving ease of clamping the brackets 206, 208 about the conduit 156 and/or avoiding deformation of the conduit 156 (e.g., via a burr formed on one of the brackets 206, 208). The notches 266 may be formed via a chamfer implemented on each base portion 212 (e.g., at the distal portion 264).

Figure 7:
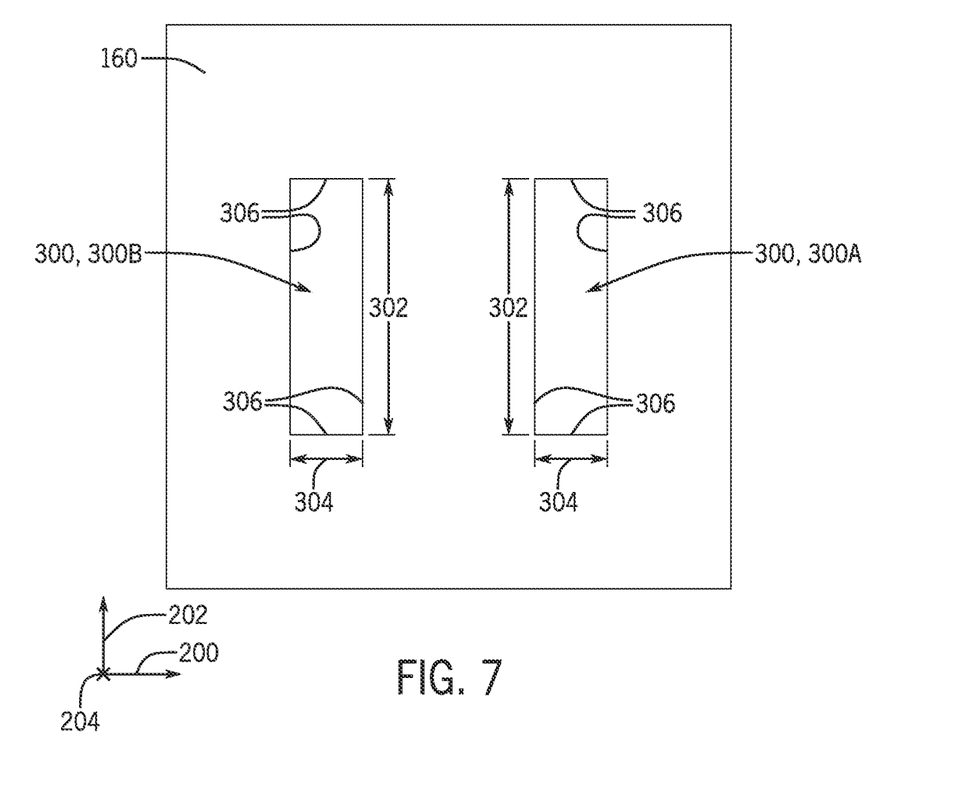
FIG. 7 is a side view of an embodiment of a panel of an HVAC&R system, in accordance with an aspect of the present disclosure.

FIG. 7 is a side view of an embodiment of the panel 160. Openings 300 (e.g., slots) may be formed through the panel 160. Each opening 300 may be configured to receive one of the tab portions 254 of the brackets 206, 208. For example, a first opening 300A may be configured to receive the tab portion 254A of the first bracket 206, and a second opening 300B may be configured to receive the tab portion 254B of the second bracket 208. Although each opening 300 has a rectangular shape in the illustrated embodiment, the openings 300 may have any suitable shape in additional or alternative embodiments to enable insertion of one of the tab portions 254 into the opening 300. For example, each opening 300 may have a first dimension 302 (e.g., a length) and a second dimension 304 (e.g., a width) that are sized to enable insertion of the tab portions 254 through the openings 300. However, the first dimension 302 and the second dimension 304 may also be sized to block relative movement between the tab portions 254 and the panel 160. As an example, edges 306 of the panel 160 at the openings 300 may capture, engage with, or abut against the tab portions 254 to block relative movement between the tab portions 254 and the panel 160. Furthermore, the base portion 212 and/or the tab portion 254 of each bracket 206, 208 may overlap with the corresponding opening 300 along the third axis 204 to block air flow through the openings 300 in the installed configuration of the conduit support assembly 162. In other words, the base portion 212 and/or the tab portion 254 of each bracket 206, 208 may occlude the openings 300. As such, air flow may be directed across the heat exchanger 152 via the panel 160 to increase efficiency of heat transfer between the heat exchanger 152 and the air flow.

Figure 8:
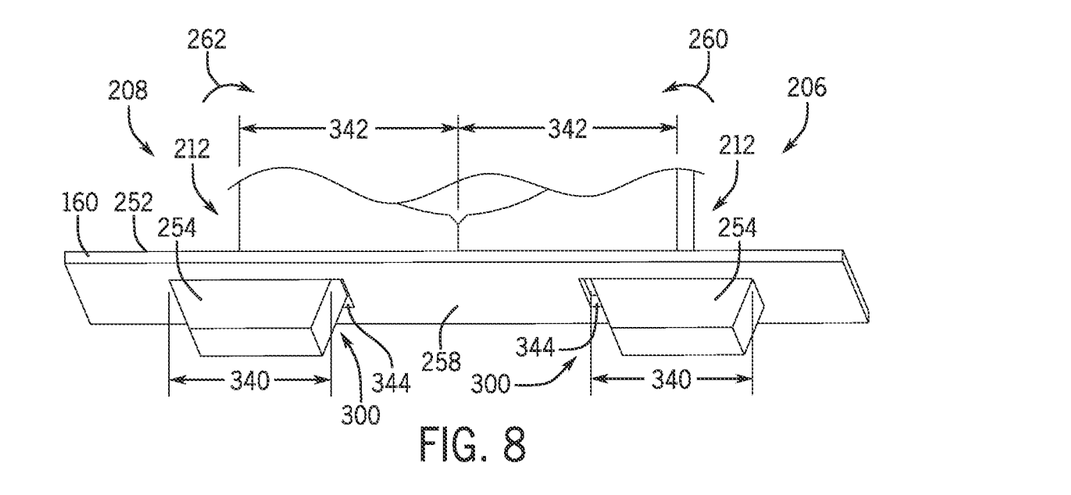
FIG. 8 is a perspective view of an embodiment of a conduit support assembly of an HVAC&R system, in accordance with an aspect of the present disclosure.

FIG. 8 is s perspective view of an embodiment of the conduit support assembly 162 in the installed configuration with the panel 160. As described above, biasing of the distal portions 264 of the brackets 206, 208 against one another may be achieved via rotation of the first bracket 206 in the first rotational direction 260 and rotation of the second bracket 208 in the second rotational direction 262. Such rotation of the brackets 206, 208 may further bias the respective base portions 212 against the first surface 252 of the panel 160 and further bias the respective tab portions 254 against the second surface 258 of the panel 160, thereby securing the brackets 206, 208 and the panel 160 to one another. Indeed, the distal portions 264 are positioned away from the coupling formed between the tab portions 254 and the panel 160 and movement of the distal portions 264 together will cause responsive movement and force at the opposing end. Each tab portion 254 may have a dimension 340 (e.g., a width) that enables sufficient engagement of the tab portion 254 with the panel 160 (e.g., the second surface 258) to secure the corresponding bracket 206, 208 to the panel 160. For example, a magnitude of the dimension 340 of the tab portion 254 may be between 50% to 90% of a corresponding magnitude of a dimension 342 (e.g., a width) of the base portion 212 corresponding to the tab portion 254. Thus, a ratio of the dimension 340 to the dimension 342 may be 0.5, 0.6, 0.7, 0.8, or 0.9 in accordance with present embodiments.

The base portion 212 of each bracket 206, 208 may engage and/or overlap with a respective portion 344 of one of the openings 300, and the tab portion 254 of each bracket 206, 208 may engage and/or overlap with a remaining portion (not shown) of the corresponding opening 300. Thus, the base portion 212 and the tab portion 254 may cooperatively occlude the corresponding opening 300 to block air flow through the panel 160 via the opening 300.

Figure 9:
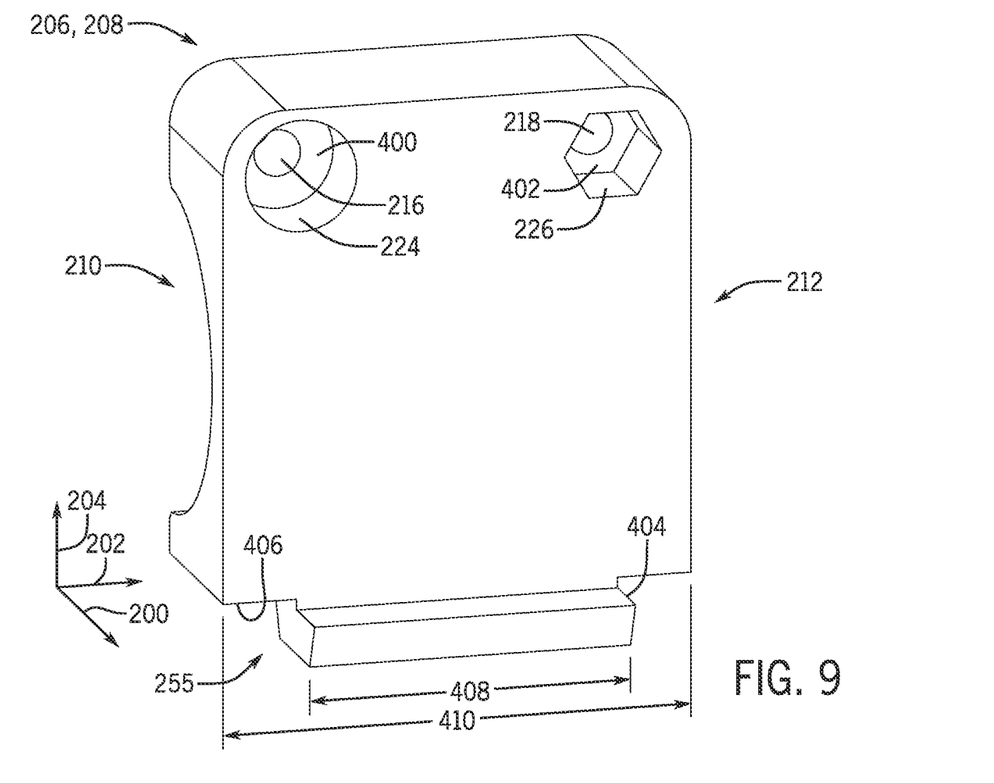
FIG. 9 is a perspective view of an embodiment of a bracket for a conduit support assembly of an HVAC&R system, in accordance with an aspect of the present disclosure.

FIG. 9 is a perspective view of an embodiment of one of the brackets 206, 208. The first opening 216 and the second opening 218 may be formed in the base portion 212 at a position or location offset from the channel 210 (e.g., relative to the third axis 204). Thus, the fasteners 220 inserted through the openings 216, 218 may not extend into or interfere with the channel 210 to avoid contact between the fasteners 220 and the conduit 156 received within the channel 210. Additionally, the first recess 224 may be formed to enable the fastener 220 to extend into the first opening 216 and abut against a first recessed surface 400 of the bracket 206, 208 within the first recess 224. The second recess 226 may be formed to enable the nut 222 to be positioned within the second recess 226 and abut against a second recessed surface 402 of the bracket 206, 208.

As described above, the tab portion 254 may extend from the third side 255 of the base portion 212 along the first axis 200. In the installed configuration of the conduit support assembly 162, a surface 404 (e.g., a top surface, an interior surface) of the tab portion 254 may be configured to engage with or abut the second side 256 of the panel 160, and a surface 406 (e.g., a bottom surface, an outer surface) of the base portion 212 may be configured to engage with or abut the first side 250 of the panel 160. To this end, a first dimension 408 (e.g., a length) of the tab portion 254 may be less than a first dimension 410 (e.g., a length) of the base portion 212. Thus, the base portion 212 may extend beyond and/or outward from the tab portion 254 along the second axis 202 to form the surface 406 along the second axis 202.

Figure 10:
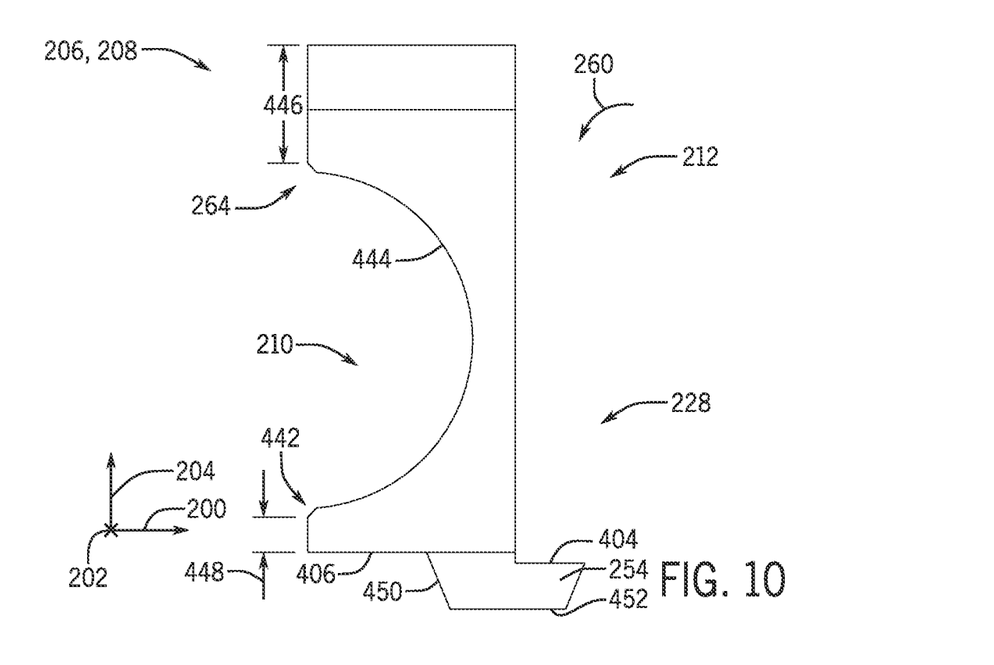
FIG. 10 is a side view of an embodiment of a bracket for a conduit support assembly of an HVAC&R system, in accordance with an aspect of the present disclosure.

FIG. 10 is a side view of an embodiment of one of the brackets 206, 208. The base portion 212 of the bracket 206, 208 may have the distal portion 264 (e.g., a first portion), a seat portion 442 (e.g., a second portion), and an arcuate portion 444 extending between the distal portion 264 and the seat portion 442 to form the channel 210. The distal portion 264 may have a dimension 446 (e.g., a height) that enables formation of the openings 216, 218 through the base portion 212 and avoids overlap between the openings 216, 218 and the arcuate portion 444 along the third axis 204 (e.g., to block extension of the fastener 220 into the channel 210). Moreover, the arcuate portion 444 may be formed to accommodate a suitable dimension, such as a diameter, of the conduit 156. The seat portion 442 may have a dimension 448 (e.g., a height) that enables the bracket 206, 208 to position the conduit 156 at a threshold or desired distance (e.g., an offset distance) away from the panel 160 in the installed configuration of the conduit support assembly 162.

A surface 450 (e.g., an intermediate surface) of the tab portion 254 may extend from the surface 406 of the base portion 212 to an exterior or distal surface 452 of the tab portion 254 at an oblique angle or slope to facilitate convenient positioning of the tab portion 254 through the opening 300 of the panel 160. For example, the angled orientation of the surface 450 may enable insertion of the tab portion 254 into the opening 300 (e.g., at an angle with respect to the orientation illustrated in FIG. 10) and then rotation of the bracket 206, 208 in the first rotational direction until the tab portion 254 (e.g., the surface 404) engages with or abuts the panel 160 (e.g., the second side 256 of the panel 160) and/or the base portion 212 (e.g., the surface 406) engages with or abuts the panel 160 (e.g., the first side 250 of the panel 160).

Figure 11:
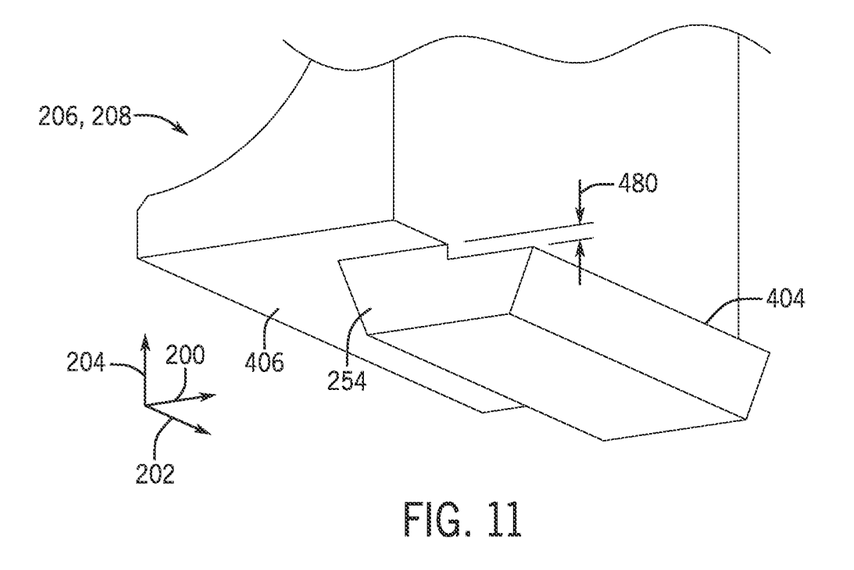
FIG. 11 is a perspective view of an embodiment of a bracket for a conduit support assembly of an HVAC&R system, in accordance with an aspect of the present disclosure.

FIG. 11 is a perspective view of an embodiment of one of the brackets 206, 208. The surface 404 of the tab portion 254 and the surface 406 of the base portion 212 may be offset from one another along the third axis 204 by a distance 480 to accommodate a dimension (e.g., a thickness) of the panel 160. For example, the distance 480 may enable the surface 404 to engage the second surface 258 of the panel 160 and enable the surface 406 to engage the first surface 252 of the panel 160. Thus, the bracket 206, 208 may capture the panel 160 in the installed configuration. The aspect of the tab portion 254 having the distance 480 may also be referred to as a neck portion 480.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A conduit support assembly for a heating, ventilation, air conditioning, and/or refrigeration (HVAC&R) system, comprising:

a bracket comprising a base portion and a tab portion, wherein the base portion comprises a channel formed therein, the channel is configured to receive a conduit of the HVAC&R system and is disposed in a bracket side of the base portion of the bracket, the base portion includes an additional bracket side opposing the bracket side, the tab portion is configured to be inserted through an opening in a panel of the HVAC&R system and extends from the base surface of the base portion and beyond the additional bracket side, the base portion and the tab portion are configured to cooperatively capture the panel in an installed configuration of the conduit support assembly, the base portion comprises a base surface configured to face a first side of the panel in the installed configuration, the tab portion comprises a tab surface configured to face a second side of the panel in the installed configuration, and the base surface extends from the tab portion to a seat portion of the base portion.

2. The conduit support assembly of claim 1, comprising an additional bracket comprising an additional base portion and an additional tab portion, wherein the additional base portion comprises an additional channel formed therein, the additional tab portion is configured to be inserted through an additional opening in the panel, the additional base portion and the additional tab portion are configured to cooperatively capture the panel in the installed configuration of the conduit support assembly, the additional base portion comprises an additional base surface configured to face the first side of the panel in the installed configuration, the additional tab portion comprises an additional tab surface configured to face the second side of the panel in the installed configuration, the additional base surface extends from the additional tab portion to an additional seat portion of the additional base portion, and the bracket and the additional bracket are configured to cooperatively capture the conduit of the HVAC&R system via the channel and the additional channel in the installed configuration.

3. The conduit support assembly of claim 2, wherein the bracket and the additional bracket are configured to be secured to one another in the installed configuration of the conduit support assembly.

4. The conduit support assembly of claim 3, wherein the bracket comprises a first opening formed through the base portion, the additional bracket comprises a second opening formed through the additional base portion, the first opening and the second opening are configured to align with one another in the installed configuration of the conduit support assembly, and the conduit support assembly comprises a fastener configured to extend through the first opening and the second opening to bias the base portion and the additional base portion against one another to secure the bracket and the additional bracket to one another.

5. The conduit support assembly of claim 1, wherein the base portion and the tab portion are configured to cooperatively occlude the opening in the installed configuration of the conduit support assembly.

6. The conduit support assembly of claim 1, wherein the tab portion comprises a second surface extending from the base surface of the base portion at an oblique angle toward an exterior side of the bracket.

7. The conduit support assembly of claim 1, comprising a recess in a side of the base portion opposite the channel.

8. The conduit support assembly of claim 1, comprising a passage extending from a first side of the base portion along the channel to a second side of the base portion, wherein the base surface extends from the first side to the second side.

9. A conduit support system for an HVAC&R system, comprising:
a first bracket;
a second bracket;
a first base portion of the first bracket, wherein the first base portion comprises a first C-shaped channel disposed in a first bracket side of the first base portion of the bracket, an additional first bracket side opposing the first bracket side, and a first base surface configured to face a first side of a support in an engaged configuration;
a second base portion of the second bracket, wherein the second base portion comprises a second C-shaped channel disposed in a second bracket side of the second base portion of the bracket and configured to cooperate with the first C-shaped channel to engage about a conduit in an engaged configuration of the conduit support system an additional second bracket side opposing the second bracket side, and a second base surface configured to face the first side of the support in the engaged configuration;
a first tab portion of the first bracket and a second tab portion of the second bracket, wherein each of the first tab portion and the second tab portion is configured to engage with a respective opening in the support, the first tab portion comprises a first tab surface configured to face a second side of the support in the engaged configuration, the second tab portion comprises a second tab surface configured to face the second side of the support in the engaged configuration, the first base surface extends from the first tab portion to a first seat portion of the first base portion, the second base surface extends from the second tab portion to a second seat portion of the second base portion the first tab portion extends from the first base surface of the first base portion and beyond the additional first bracket side, and the second tab portion extends from the second base surface of the second base portion and beyond the additional second bracket side; and
a coupling system configured to secure the first base portion to the second base portion in the engaged configuration of the conduit support system.

10. The conduit support system of claim 9, wherein a first distal end of the first base portion positioned opposite the first tab portion and a second distal end of the second base portion positioned opposite the second tab portion include the coupling system.

11. The conduit support system of claim 10, wherein the coupling system comprises a passage extending through each of the first distal end and the second distal end without passing through the first C-shaped channel or the second C-shaped channel.

12. The conduit support system of claim 9, wherein the coupling system is configured to pull together the first base portion and the second base portion at distal ends of the first base portion and the second base portion such that the first tab portion and the second tab portion are forced toward the support in the engaged configuration of the conduit support system.

13. The conduit support system of claim 9, comprising the support, wherein the support comprises a panel.

14. A conduit support system of a HVAC&R system, comprising;
a first bracket including a first channel disposed in a first bracket side of a first base portion of the first bracket, a first tab portion extending from the base portion, and a first base surface extending from the first tab portion to a first seat portion of the first base portion;
a second bracket including a second channel disposed in a second bracket side of a second base portion of the second bracket, a second tab portion extending from the second base portion, and a second base surface extending from the second tab portion to a second seat portion of the second base portion, wherein the first bracket side and the second bracket side face each other in an engaged configuration of the conduit support system such that the first channel and the second channel enclose about a conduit;
a panel comprising a first slot configured to receive the first tab portion and a second slot configured to receive the second tab portion to form a coupling such that the first base surface and the second base surface abut a first side of the panel, and such that the first tab and the second tab abut a second side of the panel that is opposite the first side; and
a coupling system configured to secure distal ends of the first base portion and the second base portion together in the engaged configuration of the conduit support system, wherein the distal ends are distal from the coupling.

15. The conduit support system of claim 14, wherein the coupling system comprises an opening extending through each of the distal ends and configured to receive a fastener.

16. The conduit support system of claim 15, wherein the opening is configured to block the fastener from interfering with the first channel or the second channel.

17. The conduit support system of claim 14, wherein the coupling system comprises a pair of receptacles, wherein each of the receptacles has a same shape.

18. The conduit support system of claim 14, wherein the distal ends comprise chamfered surfaces respectively adjacent the first channel and the second channel.

19. The conduit support system of claim 14, wherein the first base portion comprises the first seat portion disposed in the first bracket side, and the second base portion comprises the second seat portion disposed in the second bracket side.

\* \* \* \* \*